(12) United States Patent
Oel (10) Patent No.: US 9,442,359 B2
(45) Date of Patent: Sep. 13, 2016

(54) DYNAMIC VEHICLE DISPLAY UNIT (71) Applicants: VOLKSWAGEN AG, Wolfsburg (DE); AUDI AG, Ingolstadt (DE)

(72) Inventor: Peter Oel, Redwood City, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 298 days.

(21) Appl. No.: 13/914,317

(22) Filed: Jun. 10, 2013

(65) Prior Publication Data

US 2014/0362347 A1  Dec. 11, 2014

(51) Int. Cl.
| | |
|---|---|
| *G03B 21/608* | (2014.01) |
| *H04N 7/18* | (2006.01) |
| *G08G 1/123* | (2006.01) |
| *G09G 5/00* | (2006.01) |
| *B60K 35/00* | (2006.01) |
| *G06F 3/01* | (2006.01) |
| *G06F 3/03* | (2006.01) |

(52) U.S. Cl.
CPC ............ *G03B 21/608* (2013.01); *B60K 35/00* (2013.01); *G06F 3/017* (2013.01); *G06F 3/0304* (2013.01)

(58) Field of Classification Search
CPC ...... G03B 21/608; H04N 7/18; G08G 1/123; G09G 5/00; G06F 3/0304; G06F 3/017; B60K 35/00
See application file for complete search history.

(56) References Cited

U.S. PATENT DOCUMENTS

| 620,592 | A | | 3/1899 | Just |
|---|---|---|---|---|
| 5,270,752 | A | * | 12/1993 | Kataoka ............... G03B 21/608 239/18 |
| 5,823,869 | A | * | 10/1998 | Paturzo ......................... 454/152 |
| 6,819,487 | B2 | | 11/2004 | Palovuori et al. |
| 2004/0001182 | A1 | | 1/2004 | Dyner |
| 2006/0108820 | A1 | * | 5/2006 | Vican ......................... 296/37.12 |
| 2009/0267921 | A1 | * | 10/2009 | Pryor ............................ 345/177 |
| 2009/0268163 | A1 | * | 10/2009 | Bowden et al. ................ 353/13 |
| 2010/0066832 | A1 | * | 3/2010 | Nagahara et al. ............ 348/148 |
| 2011/0138322 | A1 | * | 6/2011 | Aoki ...................... B60K 35/00 715/786 |
| 2013/0076615 | A1 | * | 3/2013 | Iao ................................ 345/156 |
| 2014/0320824 | A1 | * | 10/2014 | Kim et al. ....................... 353/30 |

FOREIGN PATENT DOCUMENTS

| EP | 0503289 A1 | 9/1992 |
|---|---|---|
| WO | 2012131554 A2 | 10/2012 |

* cited by examiner

*Primary Examiner* — Temesghen Ghebretinsae
*Assistant Examiner* — Paras D Karki
(74) *Attorney, Agent, or Firm* — Barnes & Thornburg LLP (57) ABSTRACT

A passenger vehicle includes a dynamic display unit. The dynamic display unit creates a temporary graphic display inside the passenger vehicle for presenting informational and control elements to passengers inside the passenger vehicle.

19 Claims, 9 Drawing Sheets

DYNAMIC VEHICLE DISPLAY UNIT

BACKGROUND

The present disclosure relates to visual displays. More specifically, the present disclosure is directed to visual displays used in vehicles.

SUMMARY

According to the present disclosure, a passenger vehicle includes a number of passenger seats and a dashboard. The dashboard extends up from the floor and is arranged in front of the passenger seats. The dashboard illustratively includes an instrument panel having a number of gauges, a central console forming a storage compartment, a user interface panel having a touch screen display, and a steering wheel having a central hub and an outer wheel.

In illustrative embodiments, the passenger vehicle also includes a dynamic display unit configured to create a temporary graphic display inside the passenger vehicle. The dynamic display unit includes a particle-screen generator and a projector. The particle-screen generator illustratively produces a vapor screen by moving media particles generally along a viewing plane to create a screen made up of media particles. The projector projects light onto the vapor screen to create an image on the screen. The dynamic display unit may be integrated into the instrument panel, the central console, the user interface panel, and/or the steering wheel.

In illustrative embodiments, the particle-screen generator includes a blower, a nozzle, and a vacuum. The blower is configured to accelerate water particles and air to form the vapor screen. The nozzle is configured to atomize water into particles and to introduce the water particles into an air stream accelerated by the blower. The vacuum is configured to pull the water particles and air along the plane and to collect water particles In illustrative embodiments, the dynamic display unit includes sensors that detect stability of the vapor screen and that detect passenger gestures at the vapor screen. The operation of the particle-screen generator and/or a HVAC system of the passenger vehicle may be adjusted based on detected stability of the vapor screen. The operation of the dynamic display unit and/or other vehicle systems may be adjusted based on detected passenger gestures such as button presses, slider swipes, knob rotations, and the like that take place through, along, and near the vapor screen.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

Figure 1:
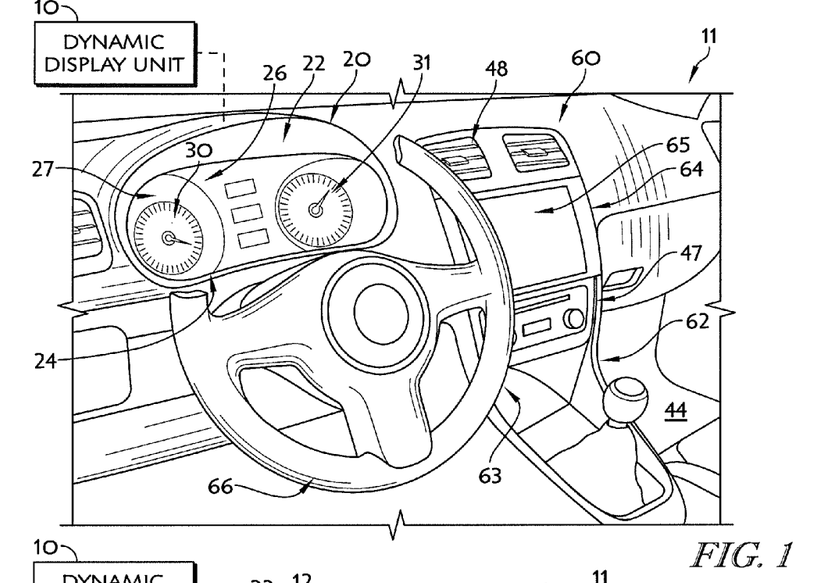
FIG. 1 is a perspective view of a dashboard included in a vehicle with a portion of a steering wheel mounted to the dashboard broken away to show an instrument panel included in the dashboard and to show (diagrammatically) that the instrument panel includes a dynamic display unit.
Figure 2:
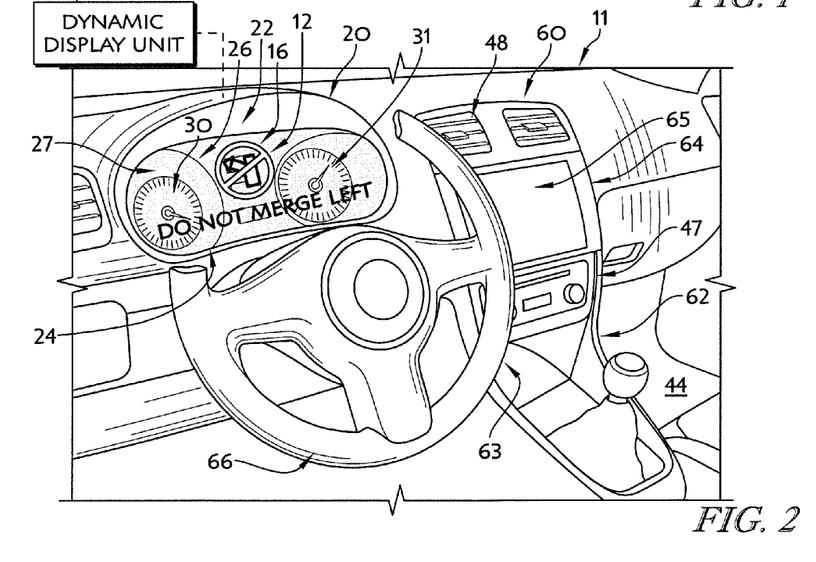
FIG. 2 is a view similar to FIG. 1 showing the dynamic display unit activated so that a temporary visual display is presented over a gauge panel included in the instrument panel.

According to the present disclosure, an illustrative passenger vehicle 11 includes a dynamic display unit 10 configured to provide a temporary graphic display 12 as suggested in FIGS. 1 and 2. When activated, the dynamic display unit 10 creates temporary graphic displays 12 for presenting information (such as warnings, updates, and the like) and/or user inputs (such as system controls to a vehicle passenger when such information and/or inputs are needed by the vehicle passenger. When deactivated, the dynamic display unit 10 removes any temporary graphic display 12 from the passenger vehicle 11 so that unneeded information and/or inputs are removed from the passenger vehicle 11.

Figure 3:
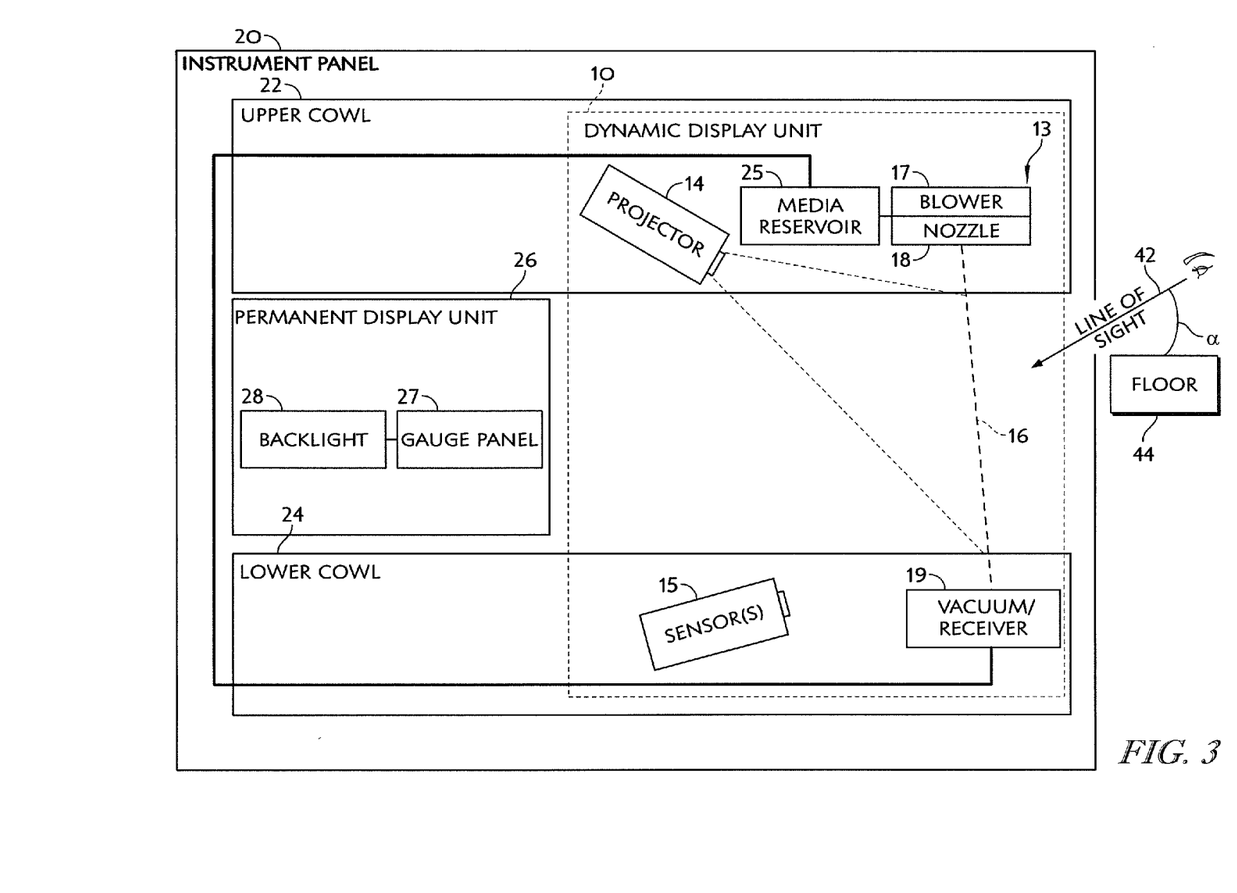
FIG. 3 is a diagrammatic view of the instrument panel of FIGS. 1 and 2 showing that the dynamic display unit includes a medium generator, a blower nozzle, and a vacuum receiver that cooperate to produce a temporary screen, and showing that the dynamic display unit includes a projector that projects images onto the temporary screen.

In the first illustrative embodiment, the dynamic display unit 10 is included in an instrument panel 20 of vehicle 11 as shown in FIGS. 1 and 2. In addition to the dynamic display unit 10, the instrument panel 20 illustratively includes an upper cowl 22, a lower cowl 24, and a permanent display unit 26 as shown in FIGS. 1-3. The upper and lower cowls 22, 24 cooperate to shade the permanent display unit 26 as suggested in FIGS. 1 and 2. The permanent display unit 26 includes a gauge panel 27 and a backlight 28 as shown diagrammatically in FIG. 3. The gauge panel 27 illustratively includes a plurality of instruments such as a speedometer 30, a tachometer 31, and the like. The backlight 28 is arranged behind the gauge panel 27 to light the gauge panel 27 during operation of the vehicle 11.

The instrument panel 20 is included in a dashboard 60 of the passenger vehicle 11 as shown in FIGS. 1 and 2. In addition to the instrument panel 20, the dashboard 60 includes a central console 62 forming a storage compartment 63, a user interface panel 64 having a touch screen display 65, and a steering wheel 66 as shown in FIGS. 1 and 2. In some embodiments, dynamic display units similar to dynamic display unit 10 may be included in the central console 62, the user interface panel 64, the steering wheel 66, and/or in other places around the vehicle 11 as suggested in the alternative embodiments shown in FIGS. 7-15.

The dynamic display unit 10 illustratively includes a particle-screen generator 13, a projector 14, and sensors 15 as shown diagrammatically in 3. The particle-screen generator 13 is configured to move water vapor generally along a plane to form a vapor screen (sometimes called a fog screen or a smoke screen) 16 as suggested in FIG. 3. The projector 14 is configured to project images onto the vapor screen 16 to create the temporary graphic display 12. The sensors 15 are illustratively optical sensors configured to detect the stability of the vapor screen 16 and to optionally detect passenger gestures at the temporary screen providing inputs to a control system 40 of the passenger vehicle 11.

The particle-screen generator 13 illustratively includes a blower 17, a nozzle 18, and a vacuum 19 as shown diagrammatically in FIG. 3. The blower 17 is mounted in the upper cowl 22 of the instrument panel 20 and is configured to accelerate water particles and air to form the vapor screen 16. In other embodiments, the blower 17 may accelerate other liquid or solid media particles and air (or other gasses) to form the vapor screen 16. The nozzle 18 is illustratively coupled to the blower 17 in the upper cowl 22 and is configured to atomize water (or other media) into particles and to introduce the water particles (or other particles) into an air stream accelerated by the blower 17 so that the blower 17 accelerates the particles along the plane of the vapor screen 16. The vacuum 19 is mounted in the lower cowl 24 of the instrument panel 20 and is configured to pull the water (and/or other) particles and air along the plane and to collect water particles. In some embodiments, the vacuum 19 may be omitted and a passive receiver may collect the water particles, or the water particles may be left to be absorbed into the atmosphere inside the vehicle.

In the illustrative embodiment, the particle-screen generator 13 is configured to form the vapor screen 16 along a plane that is not perpendicular to the vehicle floor 44 or to the ground underlying the vehicle 11. Rather, the illustrative particle-screen generator 13 forms the vapor screen 16 at an obtuse angle with the vehicle floor 44 as shown in FIG. 3. By inclining the vapor screen 16, reflection of light into a passengers eyes from the sun or other light sources may be reduced or eliminated. In some embodiments, a particle-screen generator may form a vapor screen arranged at an acute angle or a right angle with the floor 44. In other embodiments, a particle-screen generator may form a vapor screen arranged parallel to the floor 44, such as in embodiments in which a particle-screen generator forms a vapor screen over a cup holder in the passenger vehicle 11.

Figures 4, 5, 6:
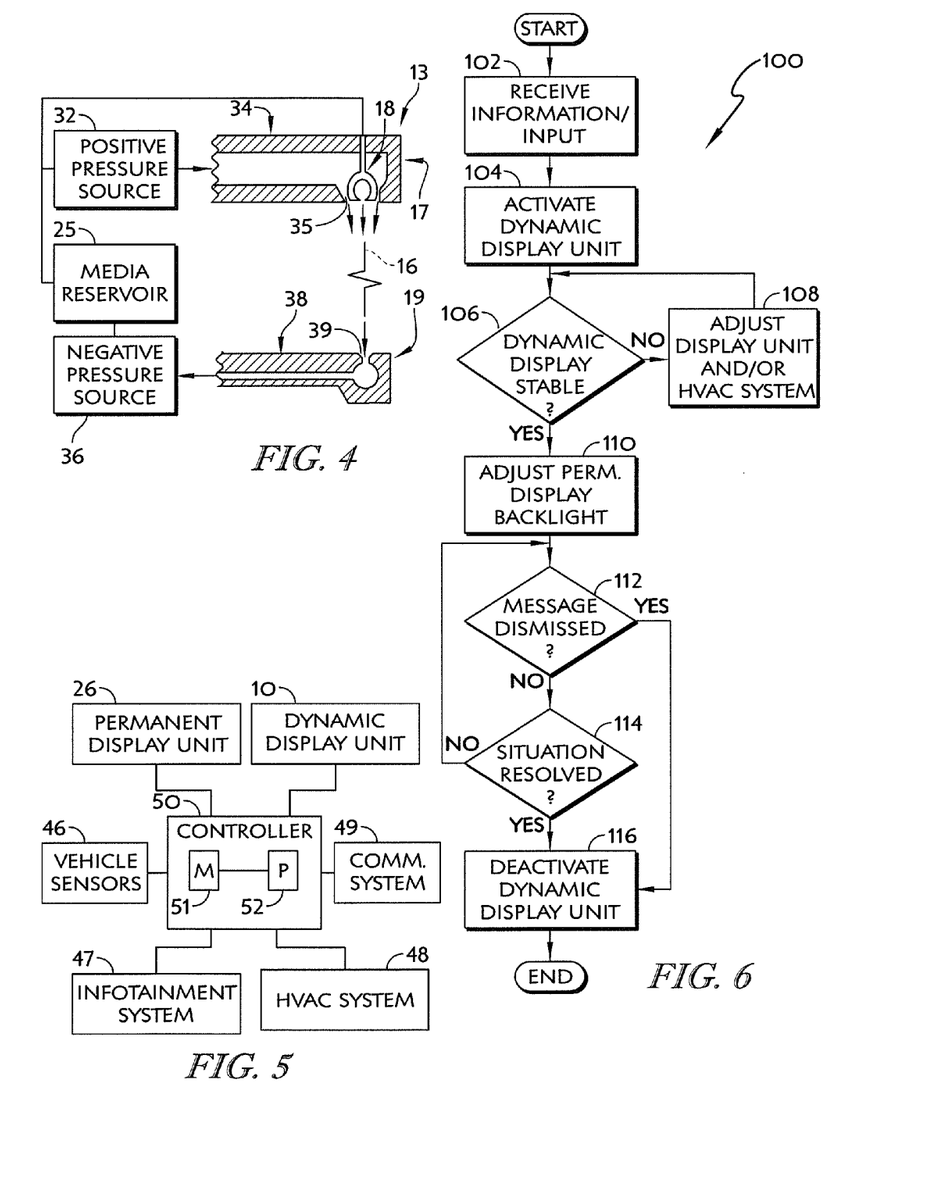
FIG. 4 is a cross-sectional view of an illustrative blower nozzle and vacuum receiver adapted for use in the dynamic display unit of FIGS. 1-3 showing that the blower nozzle directs a single layer of medium (illustratively fog) between two layers of stabilizing air toward the vacuum receiver.
FIG. 5 is a diagrammatic view of a vehicle control system including the dynamic display unit of FIGS. 1-3 showing that the control system also includes a controller coupled to the dynamic display unit along with a number of other vehicle systems coupled to the controller.
FIG. 6 is a flow chart showing an illustrative algorithm performed by the controller during operation of the vehicle.

Turning briefly to FIG. 4, an illustrative arrangement of the particle-screen generator 13 is shown. The illustrative blower 17 includes a positive pressure source 32 and a duct 34 with an opening 35 directed along the plane of the vapor screen 16. The nozzle 18 is arranged inside the duct 34. The nozzle 18 is illustratively configured to dispense atomized water particles about mid-way along the opening 35 so that the atomized water particles are deposited in the accelerated air stream from the duct 34 of the blower 17 with a layer of clean air on either side of the vapor screen 16 as suggested in FIG. 4. The layers of clean air provide a buffer around the vapor produced by the nozzle 18 and encourages laminar flow of the vapor by absorbing turbulence and other instabilities around the vapor screen 16. Additionally, the nozzle 18 may be coupled to the positive pressure source 32 of the blower 17 to drive water through the nozzle 18 as shown in FIG. 6. The vacuum 19 illustratively includes a negative pressure source 36 and a duct 38 with an opening 39 arranged along the plane of the vapor screen 16. The duct 38 is configured to collect and conduct water particles from the vapor screen 16.

In some embodiments, additional blowers, nozzles, and/or vacuums may be used to improve stability of the vapor screen 16. For example, additional blowers, nozzles, and/or vacuums may be arranged along the sides of the instrument panel 20 to direct flow and/or add vapor to the vapor screen 16. Other mechanisms such as edge channels, fins, and the like for further stabilizing the vapor screen 16 may also be incorporated into the dynamic display unit 10.

In the illustrative embodiment, the particle-screen generator 13 also includes a media reservoir 25 mounted in the upper cowl 22 coupled to the nozzle 18 and the vacuum 19 as shown diagrammatically in FIGS. 3 and 4. The media reservoir 25 holds water (or other media) prior to introduction into the nozzle 18. Water (or other media) is returned to the media reservoir 25 after being moved along the vapor screen 16 by the vacuum 19. Thus, water (or other media) may be reused in the vapor screen 16 during operation of the particle-screen generator 13.

In some embodiments, the media reservoir 25 may include a heating element (not shown) for vaporizing media in the media reservoir 25 prior to movement of the media to the nozzle 18. In some such embodiments, the nozzle 18 may direct the already vaporized media without further atomizing the media as it is introduced into the air stream provided by the blower 17 and the vacuum 19.

In some embodiments, other particle-screen generation means may be incorporated into the dynamic display unit 10. For example, fog machines, smoke machines, haze machines, and the like may be incorporated as part of the particle-screen generator. In at least one embodiment, the particle-screen generation means includes a particle-screen generation device similar to the fog-screen generator available from Fogio Inc. of Finland. In at least one other embodiment, the particle-screen generation means includes a particle-screen generation device similar to the fog-screen generator available from Fogio Inc. of Finland.

Referring again to FIG. 3, projector 14 is mounted to the upper cowl 22 of the instrument panel 20. The projector 14 is arranged behind the vapor screen 16 and in front of the permanent display unit 26. The projector 14 is illustratively angled so that light projected toward the vapor screen 16 that passes through the vapor screen without hitting a particle is not directed into the line of sight 42 of a passenger in the vehicle 11. Generally, the line of sight 42 of a passenger is between 0° and about 90° relative to a vehicle floor 44 as suggested by angle a in FIG. 3. Accordingly, the projector 14 is angled so as not to project light parallel to the line of sight 42 of a passenger. In some embodiments, the projector may be mounted to the lower cowl 24 or the permanent display unit 26 of the instrument panel 20. In some embodiments, the projector 14 may be arranged in front of the vapor screen 16. In such embodiments, the angle of the projector 14 may be parallel to the line of sight 42 of a passenger.

The projector 14 may be made up of one or more projection elements (not shown). In the illustrative embodiment the projector 14 includes red, green, and blue laser diodes to provide full color images on the vapor screen 16. In the other embodiments, laser diodes of only one color may be used and certain laser diodes may be arranged to project onto certain portions of the vapor screen 16.

The sensors 15 are illustratively mounted to the lower cowl 24 of the instrument panel 20 as shown diagrammatically in FIG. 3. The sensors 15 are configured to monitor stability of the vapor screen 16 and to detect gestures from a user to provide inputs to the vehicle control system 40. To detect stability, the sensors 15 are illustratively visual sensors (cameras) configured to evaluate the solidity, reflectivity, flow, position and/or other characteristics of the vapor screen 16. In some embodiments, the sensors 15 may include other types of sensor configured to detect characteristics of the vapor screen 16.

To detect gestures from a user, the sensors 15 are illustratively visual sensors (cameras) configured to detect passenger movements in three-dimensional space at the vapor screen 16 and/or disruptions to the vapor screen 16 corresponding to passenger interference with the vapor screen 16. The detected movements are sued to identify predetermined user interactions with the dynamic display unit 10 corresponding to button presses, slider swipes, knob rotation, and the like that take place through, along, and near the vapor screen 16. In some embodiments, laser sensors may also be used to detect user interactions at the vapor screen 16 in a manner similar to that described in U.S. Pat. No. 6,266,048 which is incorporated herein by reference in its entirety.

The control system 40 of the passenger vehicle 11 is illustratively made up of the dynamic display unit 10, the permanent display unit 26, a plurality of vehicle sensors 46, an infotainment system 47, a heating ventilation and air conditioning (HVAC) system 48, a communication system 49, and a controller 50 as shown in FIG. 5. The vehicle sensors 46 illustratively include sensors to detect surrounding traffic conditions, vehicle tire pressure, engine condition, vehicle fluid levels, and other vehicle conditions. The infotainment system 47 illustratively includes a stereo, various screens throughout the vehicle 11, and other informational and entertainment equipment included in the vehicle 11. Informational elements and/or control elements associated with the infotainment system 47 may be displayed on the temporary graphic display 12.

The HVAC system 48 is configured to provide heating and cooling throughout the vehicle 11 via cooled or heated air blown through the vehicle 11. In some embodiments, the HVAC system 48 may include heating and cooling systems incorporated into seating (not shown) included in the vehicle 11. The communication system 49 includes blue tooth connectivity circuits configured to connect to mobile phones, satellite link circuits to connect to satellite information such as radio, television, and navigation, and other communication circuits.

The controller 50 is coupled for communication with the rest of the control system 40 to control operation of the control system 40 as suggested in FIG. 5. The controller 50 illustratively includes a memory 51 and a processor 52 coupled to the memory 51 and configured to execute instructions held in the memory 51. In the illustrative embodiment, the memory 51 contains a process 100, shown in FIG. 6, to be executed by the processor 52.

The process 100 illustratively includes a first step 102 in which the controller 50 receives a predetermined piece of information from the vehicle sensors 46 or a user input from the infotainment system 47. Upon receipt of the information or user input, the controller 50 activates the dynamic display unit 10 in a step 104 so that the temporary graphic display 12 is created in the instrument panel 20 as shown, for example, in FIG. 2. In one illustrative example, upon receipt of information from blind-spot monitoring sensors that a lane change could result in a collision, the controller 50 may activate the dynamic display unit 10 so that a temporary graphic display 12 warning a driver of the risk is displayed as shown in FIG. 2.

In a step 106, the controller 50 may determine if the vapor screen 16 is stable based on inputs from the sensors 15 included in the dynamic display unit 10. If the vapor screen 16 is determined not to be stable, the controller 50 proceeds to a step 108 in which the controller 50 adjust the operation of the particle-screen generator 13 and/or the operation of the HVAC system 48 to increase stability of the vapor screen 16. For example, if the vapor screen 16 is determined not to be stable, the controller 50 may increase flow through the particle-screen generator 13 to increase stability of the vapor screen 16. In addition or alternatively, the controller 50 may reduce the volume of air being moved by the HVAC system 48 that might be interfering with the vapor screen 16. Further in some embodiments, the controller 50 may increase the level of heating or cooling provided to vehicle seating by the HVAC system 48 to compensate for heating or cooling lost by reducing air flow from the HVAC system 48. After the controller 50 has made adjustments in step 108, the controller 50 again checks for vapor screen 16 stability in step 106.

In a step 110 of the process 100 the controller 50 adjusts the backlight 28 of the permanent display unit 26 behind the vapor screen 16. For example, the controller 50 may dim the backlight 28 so that images projected on the vapor screen 16 are increasingly visible to a passenger in the vehicle 11. Alternatively, the controller 50 may brighten the backlight 28 so that the gauge panel 27 is at least minimally visible through the vapor screen 16.

In a step 112 of the process 100, the controller 50 determines if the message on the temporary graphic display 12 has been dismissed by a passenger in the vehicle 11. The controller 50 may determine that the message has been dismissed by a user pressing a button, giving a verbal command, or providing some other input to the controller 50. If the controller 50 determines that the message has been dismissed, the controller 50 may proceed to a step 116 of the process 100 in which the controller 50 deactivates the dynamic display unit 10.

If the controller 50 determines that the message has not been dismissed, the controller 50 may proceed to a step 118 of the process 100 to determine if the situation that resulted in the activation of the dynamic display unit 10 has been resolved. For example, if the blind spot monitoring sensors no long detect an obstruction blocking a left lane change, the controller 50 may determine that the situation that caused the controller 50 to activate the dynamic display unit 10 has been resolved and may deactivate the dynamic display unit 10.

Figure 7:
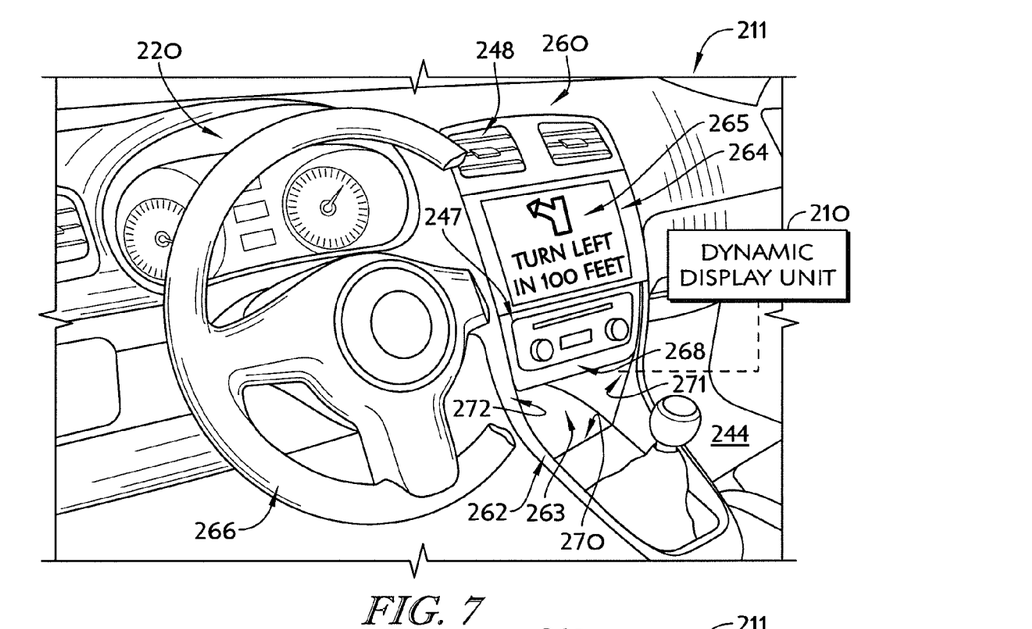
FIG. 7 is a view similar to FIG. 1 of an alternative passenger vehicle with a portion of the steering wheel broken away to show a central console having a storage compartment included in a dashboard and to show (diagrammatically) that the central console includes a dynamic display unit.
Figure 8:
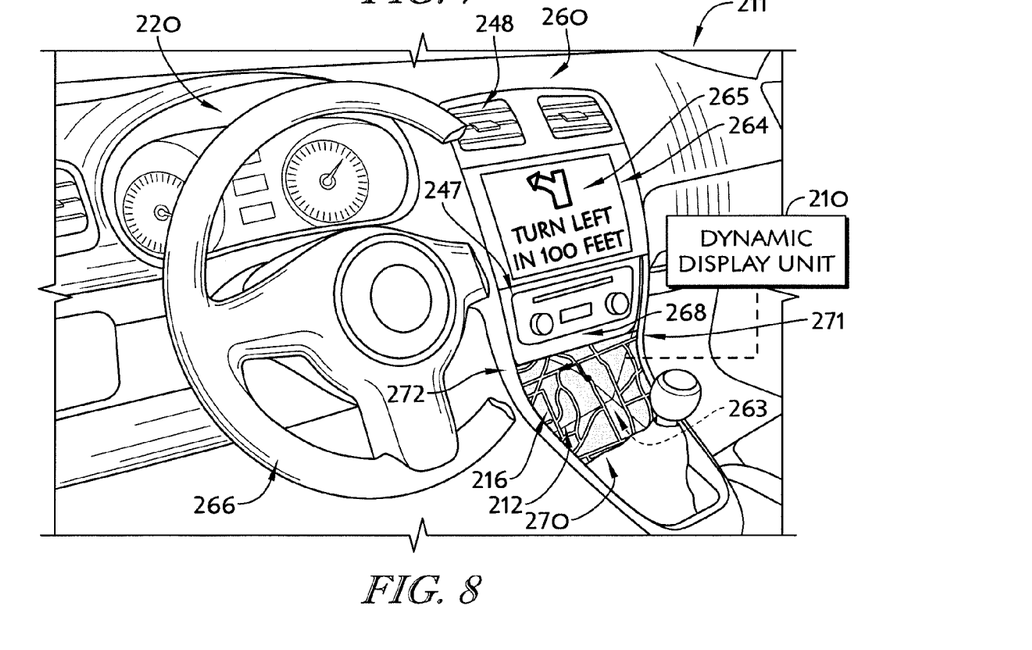
FIG. 8 is a view similar to FIG. 7 showing the dynamic display unit activated so that a temporary visual display is presented over the storage compartment included in the central console.
Figure 9:
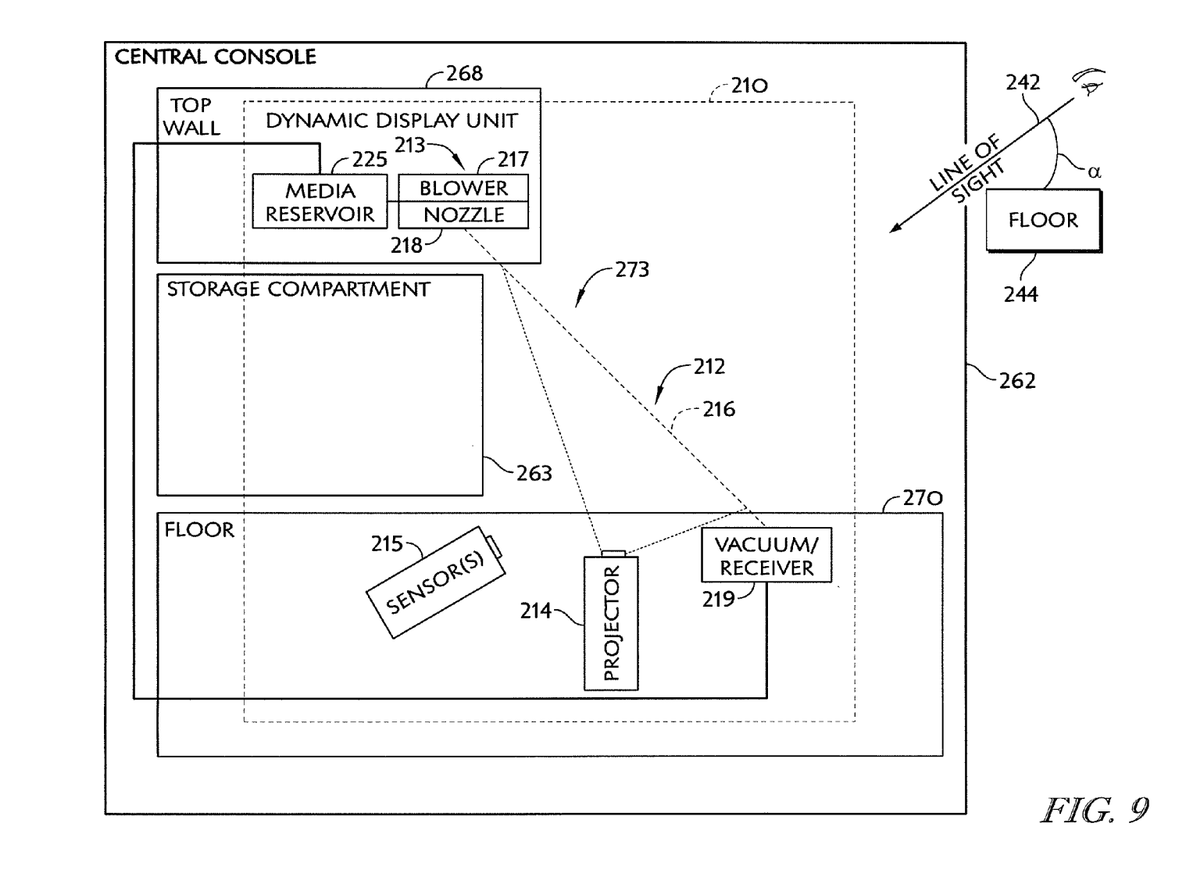
FIG. 9 is a diagrammatic view of the central console of FIGS. 7 and 8 showing the arrangement of the dynamic display unit.

Turning now to FIGS. 7-9, another passenger vehicle 211 having a dynamic display unit 210 is shown. The passenger vehicle 211 and dynamic display unit 210 are substantially similar to the passenger vehicle 11 and the dynamic display unit 10 of FIGS. 1-6 described herein. Accordingly, similar reference numbers in the 200 series indicate features that are common between the passenger vehicle 11 with the dynamic display unit 10 and the passenger vehicle 211 with the dynamic display unit 210. Thus, the description of the passenger vehicle 11 and the dynamic display unit 10 are hereby incorporated by reference to apply to the passenger vehicle 211 and the dynamic display unit 210, except in instances when it conflicts with the specific description and drawings of the passenger vehicle 211 and the dynamic display unit 210.

Unlike the dynamic display unit 10 which is integrated into the instrument panel 20 of the vehicle 11, the dynamic display unit 210 is integrated into a central console 262 included in the dashboard 260 of the vehicle 211 as shown in FIGS. 7-9. In addition to the dynamic display unit 210, the central console 262 includes a top wall 268, a floor 270, and side walls 271, 272 that cooperate to define a storage compartment 263 accessible through an opening 273 as shown in FIG. 7. In the illustrative embodiment, the dynamic display unit 210 is arranged to provide a temporary graphic display 212 that extends over the opening 273 of the central console 262 as shown in FIGS. 8 and 9. The top wall 268, the floor 270, and the side walls 271, 272 may contribute to stability of the temporary graphic display 212 by blocking turbulent air and other disturbances from the temporary graphic display 212. During operation of the dynamic display unit 210, a passenger can reach through the temporary graphic display 212 into the storage compartment 263.

The dynamic display unit 210 is similar to the dynamic display unit 10 and illustratively includes a particle-screen generator 213, a projector 214, and sensors 215 as shown diagrammatically in FIG. 9. The particle-screen generator 213 is similar to the particle-screen generator 13 and illustratively includes a blower 217, a nozzle 218, a vacuum 219, and a media reservoir 225 integrated into the top wall 268 and the floor 270 of the central console 262 as shown diagrammatically in FIG. 9. The blower 217, the nozzle 218, and the media reservoir 225 are illustratively included in the top wall 268 of the central console 262. The vacuum 219 is included in the floor 270 of the central console 262. The projector 214 and the sensors 215 are each included in the floor 270 of the central console 262. In some embodiments, In some embodiments, additional blowers, nozzles, and/or vacuums may be used to improve stability of a vapor screen 216 provided by the particle-screen generator 213. For example, additional blowers, nozzles, and/or vacuums may be arranged along the side walls 271, 272 of the central console 262 to direct flow and/or add vapor to the vapor screen 216. Other mechanisms such as edge channels, fins, and the like for further stabilizing the vapor screen 216 may also be incorporated into the dynamic display unit 210.

Figure 10:
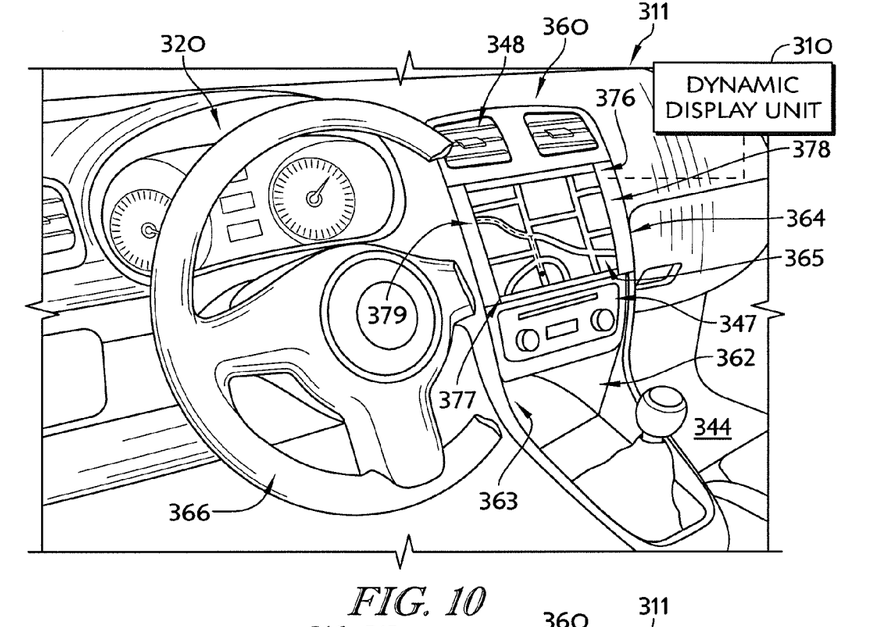
FIG. 10 is a view similar to FIGS. 1 and 7 of another alternative passenger vehicle with a portion of a steering wheel broken away to show a user interface panel included in a dashboard and to show (diagrammatically) that the user interface panel includes a dynamic display unit.
Figure 11:
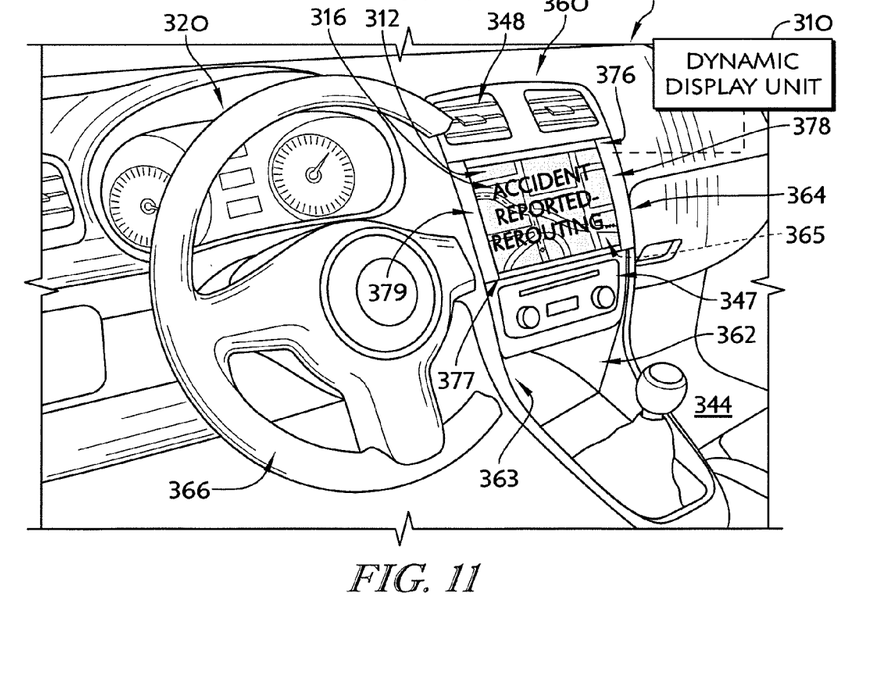
FIG. 11 is a view similar to FIG. 10 showing the dynamic display unit activated so that a temporary visual display is presented over a permanent display unit included in the user interface panel.
Figure 12:
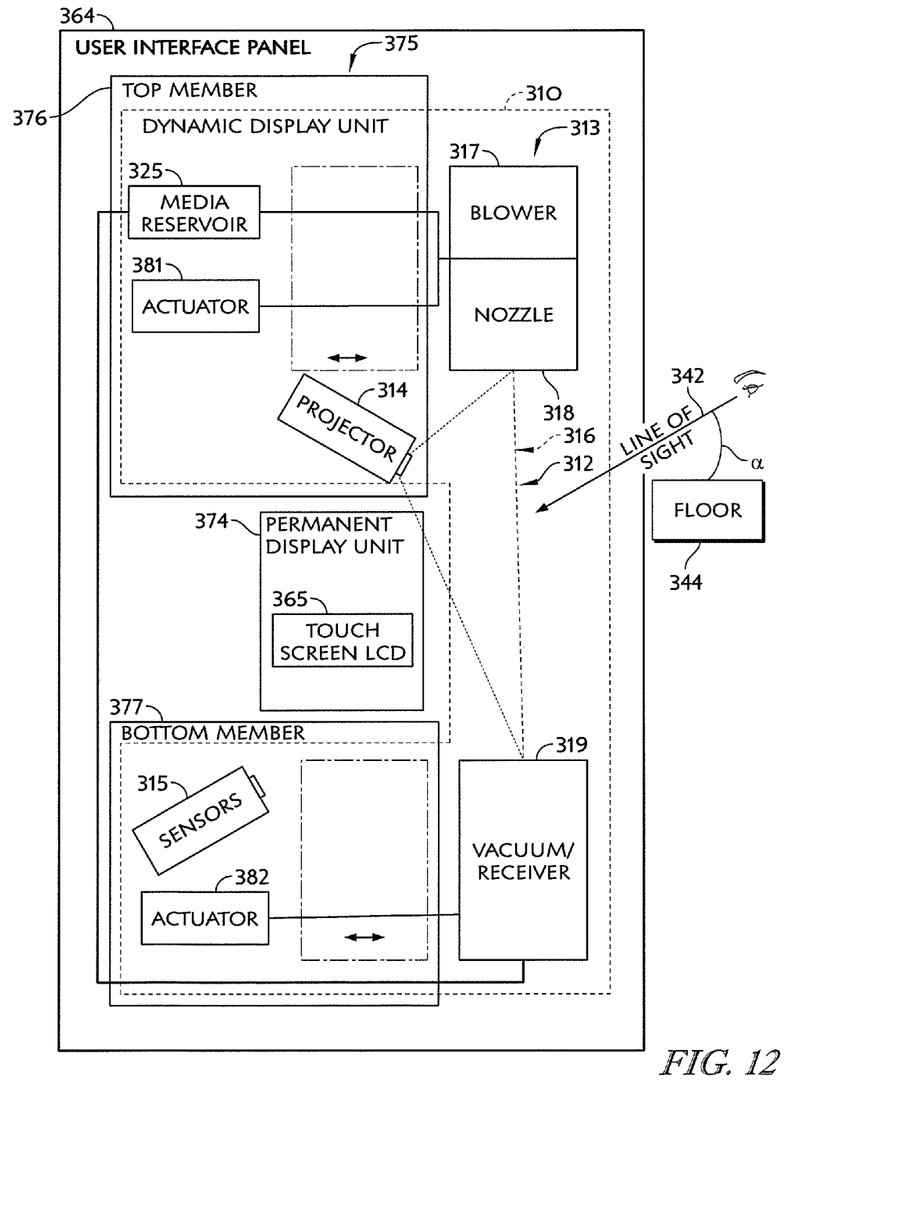
FIG. 12 is a diagrammatic view of the central console of FIGS. 10 and 11 showing the arrangement of the dynamic display unit.

Turning now to FIGS. 10-12, another passenger vehicle 311 having a dynamic display unit 310 is shown. The passenger vehicle 311 and dynamic display unit 310 are substantially similar to the passenger vehicle 11 and the dynamic display unit 10 of FIGS. 1-6 described herein. Accordingly, similar reference numbers in the 300 series indicate features that are common between the passenger vehicle 11 with the dynamic display unit 10 and the passenger vehicle 311 with the dynamic display unit 310. Thus, the description of the passenger vehicle 11 and the dynamic display unit 10 are hereby incorporated by reference to apply to the passenger vehicle 311 and the dynamic display unit 310, except in instances when it conflicts with the specific description and drawings of the passenger vehicle 311 and the dynamic display unit 310.

Unlike the dynamic display unit 10 which is integrated into the instrument panel 20 of the vehicle 11, the dynamic display unit 310 is integrated into a user interface panel 364 having a touch screen display 265 as shown in FIGS. 10-12. The touch screen display 265 is included in a permanent display unit 374 that is mounted in a frame 375 of the user interface panel 364 as shown in FIGS. 10 and 11. The frame 375 illustratively includes a top member (or cowl) 376, a bottom member (or cowl) 377, and side members (or cowls) 378, 379. In the illustrative embodiment, the dynamic display unit 310 is arranged to provide a temporary graphic display 312 that extends over the permanent display unit 374 of the user interface panel 364 as shown in FIG. 11. The location of the temporary graphic display 312 may provide a three-dimensional effect when used with the permanent display unit 274 and may be operated in conjunction with the permanent display unit 374 to provide complementary information and/or controls. During operation of the dynamic display unit 310, a passenger can reach through the temporary graphic display 312 to interact with the touch screen display 365 of the permanent display unit 374.

The dynamic display unit 310 is similar to the dynamic display unit 10 and illustratively includes a particle-screen generator 313, a projector 314, and sensors 315 as shown diagrammatically in FIG. 12. The particle-screen generator 313 is similar to the particle-screen generator 13 and illustratively includes a blower 317, a nozzle 318, a vacuum 319, and a media reservoir 325 integrated into the top member 376 and the bottom member 377 of the frame 375 as shown diagrammatically in FIG. 12. The blower 317, the nozzle 318, and the media reservoir 325 are illustratively included in the top member 376 of the frame 375. The vacuum 319 is included in the bottom member 377 of the frame 375. The projector 314 is included in the top member 376 and the sensors 215 are included in the bottom member 377 of the frame 375.

In some embodiments, additional blowers, nozzles, and/or vacuums may be used to improve stability of a vapor screen 316 provided by the particle-screen generator 313. For example, additional blowers, nozzles, and/or vacuums may be arranged along the side members 378, 379 of the frame 375 to direct flow and/or add vapor to the vapor screen 316. Other mechanisms such as edge channels, fins, and the like for further stabilizing the vapor screen 316 may also be incorporated into the dynamic display unit 310.

Unlike the dynamic display unit 10, the dynamic display unit 310 also includes actuators 381, 382 configured to move some components 317, 318, 319 of the particle-screen generator 313 between a stowed and a deployed position as suggested in FIG. 12. More specifically, the actuator 381 is coupled to the blower 317 and the nozzle 318 of the dynamic display unit 310 and moves the blower 317 and the nozzle 318 between a stowed position (shown in phantom) and a deployed position (shown in solid). The actuator 382 is coupled to the vacuum 319 of the dynamic display unit 310 and moves the vacuum 319 between a stowed position (shown in phantom) and a deployed position (shown in solid).

In the stowed position, the components 317, 318, 319 of the particle-screen generator 313 are housed substantially inside the frame 375 of the user interface panel 364. In the deployed position, the components 317, 318, 319 of the particle-screen generator 313 are moved substantially outside the frame 375 of the user interface panel 364. The components 317, 318, 319 are moved to the deployed position when the dynamic display unit 310 is activated and are moved to the stowed position when the dynamic display unit 310 is deactivated.

The dynamic display unit 310 may also be used to alleviate reflection of the sun or other light sources from the permanent display unit 374 back into a passenger's eyes as suggested in FIG. 11. More specifically, because the vapor screen 316 has a different reflectivity than the permanent display 374 and is arranged between the permanent display unit 374 and a passenger, activating the dynamic display unit 310 may reduce the amount of light reflected back at a passengers eyes when the sun (or another light source) is reflected back at a passenger from the permanent display unit 374.

In some embodiments, the control system 340 of the passenger vehicle 311 may include sensors configured to detect when light from the sun (or other light sources) is directed onto the permanent display unit 374 at an angle and/or intensity that will reflect into the eyes of a passenger. In response to receiving a signal from the sensors, the controller 350 of the vehicle 311 may activate the dynamic display unit 310 in order to establish the vapor screen 316 and to reduce light reflection into a passengers eyes. The dynamic display unit 310 may then reproduce the contents of the permanent display unit 374 or augment the contents of the permanent display unit 374 so that a passenger can still send and receive information from the area of the dashboard 60 associated with the permanent display unit 374.

Figure 13:
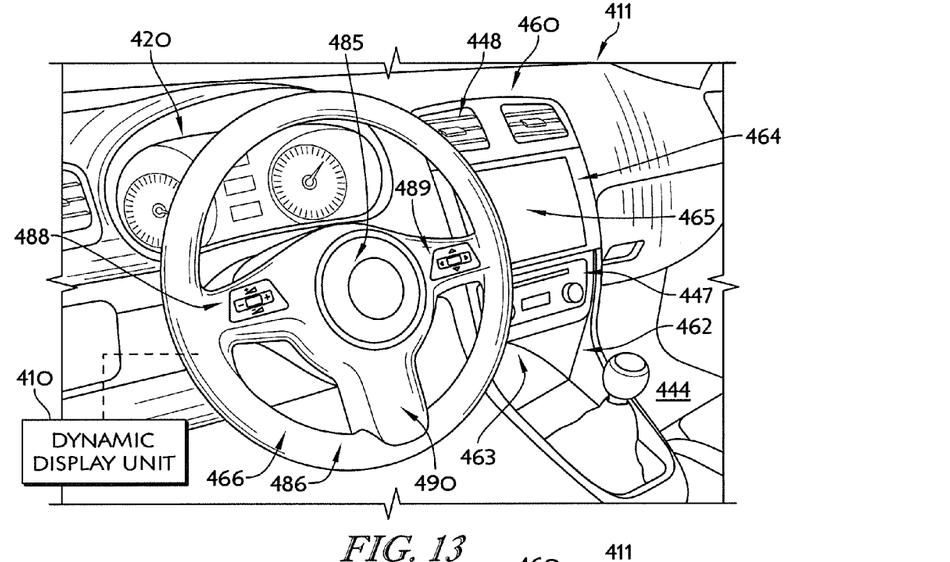
FIG. 13 is a view similar to FIGS. 1, 7, and 10 of yet another alternative passenger vehicle showing (diagrammatically) that a steering wheel coupled to a dashboard includes a dynamic display unit.
Figure 14:
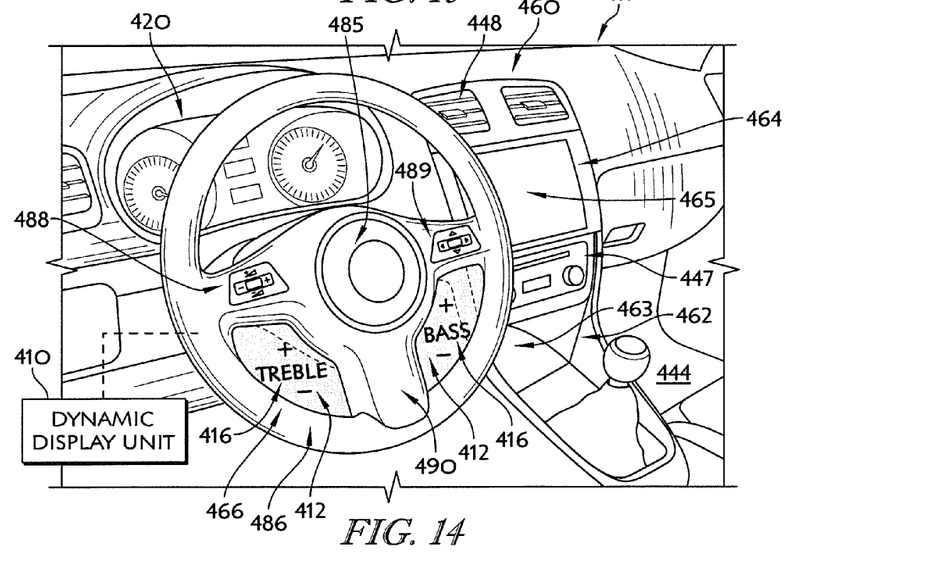
FIG. 14 is a view similar to FIG. 13 showing the dynamic display unit activated to that a temporary visual display is presented between a hub and a wheel included in the steering wheel.
Figure 15:
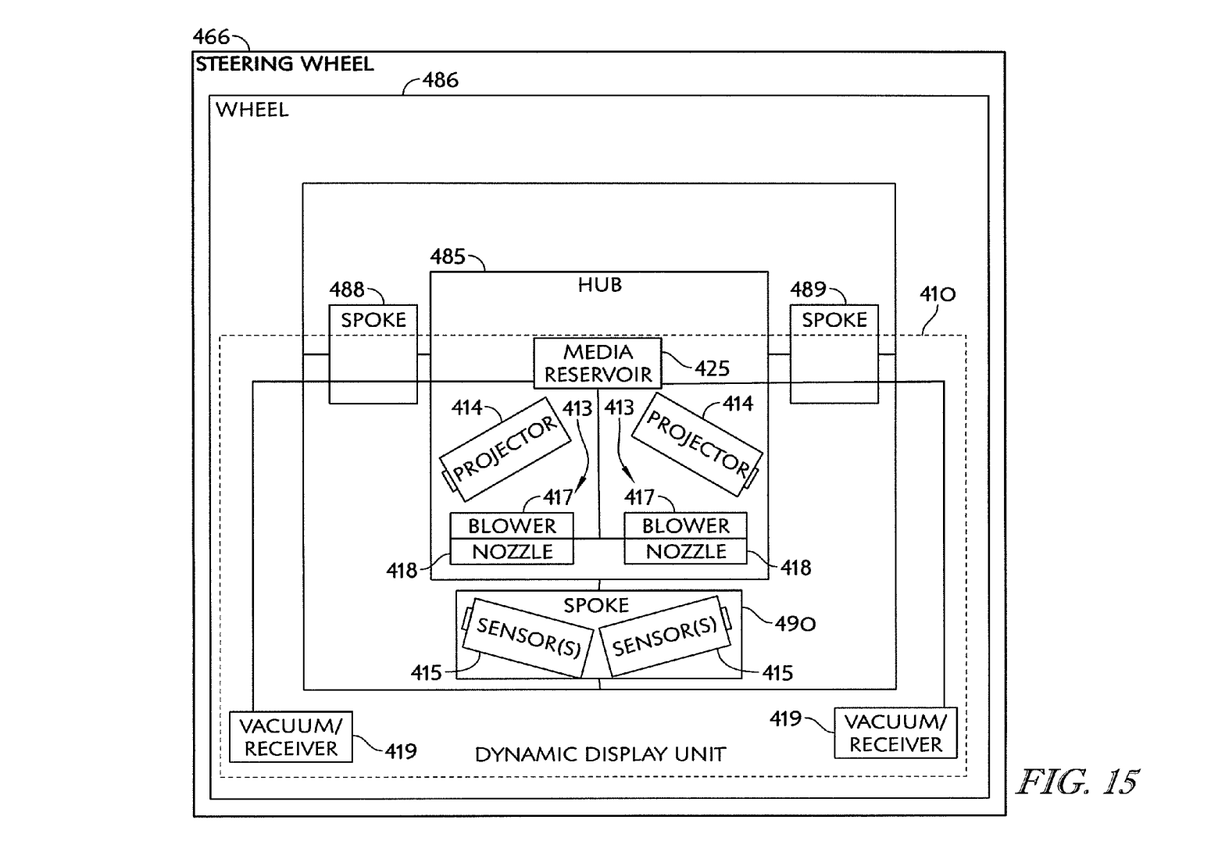
FIG. 15 is a diagrammatic view of the steering wheel of FIGS. 13 and 14 showing the arrangement of the dynamic display unit.

Turning now to FIGS. 13-15, another passenger vehicle 411 having a dynamic display unit 410 is shown. The passenger vehicle 411 and dynamic display unit 410 are substantially similar to the passenger vehicle 11 and the dynamic display unit 10 of FIGS. 1-6 described herein. Accordingly, similar reference numbers in the 400 series indicate features that are common between the passenger vehicle 11 with the dynamic display unit 10 and the passenger vehicle 411 with the dynamic display unit 410. Thus, the description of the passenger vehicle 11 and the dynamic display unit 10 are hereby incorporated by reference to apply to the passenger vehicle 411 and the dynamic display unit 410, except in instances when it conflicts with the specific description and drawings of the passenger vehicle 411 and the dynamic display unit 410.

Unlike the dynamic display unit 10 which is integrated into the instrument panel 20 of the vehicle 11, the dynamic display unit 410 is integrated into a steering wheel 466 as shown in FIGS. 13-15. In addition to the dynamic display unit 410, the steering wheel 466 illustratively includes a hub 485, a wheel 486 extending around the hub 485, and a plurality of spokes 488, 489, 490 that extend from the hub 485 to the wheel 486 as shown in FIGS. 13-15. In the illustrative embodiment, the dynamic display unit 410 is arranged to provide a temporary graphic display 412 that extends through spaces defined by the hub 485, the wheel 486, and the spokes 488, 489, 490 as shown in FIG. 14.

The dynamic display unit 410 is similar to the dynamic display unit 10 and illustratively includes particle-screen generators 413, projector 414, and sensors 415 as shown diagrammatically in FIG. 15. The particle-screen generators 413 are each similar to the particle-screen generator 13 and illustratively includes blowers 417, nozzles 418, vacuums 419, and a media reservoir 425 integrated into the hub 485 and the wheel 486 of the steering wheel 466 as shown diagrammatically in FIG. 16. The blowers 417, the nozzles 418, and the media reservoir 425 are illustratively included in the hub 485 of the steering wheel 466. The vacuums 419 are included in the outer wheel 486 of the steering wheel 466. The projectors 414 are included in the hub 485 and the sensors 415 are included in the spoke 490 of the steering wheel 466.

In some embodiments, additional blowers, nozzles, and/or vacuums may be used to improve stability of a vapor screen 416 provided by the particle-screen generator 413. For example, additional blowers, nozzles, and/or vacuums may be arranged along the spokes 488, 489, 490 of the steering wheel 466 to direct flow and/or add vapor to the vapor screen 416. Other mechanisms such as edge channels, fins, and the like for further stabilizing the vapor screen 416 may also be incorporated into the dynamic display unit 410.

Some passenger vehicles include more than one permanent graphic display for conveying information to passengers and in some instances for receiving inputs from passengers. Such permanent displays are arranged in different locations inside passenger vehicles and are viewable by passengers in the vehicle. The use of multiple permanent graphic displays presents technical problems relating to the identification of needed informational or control elements when the needed informational or control element is presented in one of several possible locations around the vehicle.

Embodiments of the present disclosure provide a solution to the technical problem that needed informational and/or control elements may be difficult to find on one of many permanent displays. Specifically, the present disclosure provides a dynamic display unit for creating a temporary graphic display including needed informational and/or control elements so that the needed element can be quickly identified by a vehicle passenger.

Additionally, many passenger vehicles are configured to provide a limited amount of permanent display space for conveying information and for receiving passenger inputs. Such configurations may display a limited number of control element that are associated with a number of other informational or control elements when selected. Thus, the use of a limited amount of permanent display space presents technical problems relating to the quick review or selection of informational and/or control elements without moving through multiple levels of control elements.

Embodiments of the present disclosure provide a solution to the technical problem of limited amounts of permanent display space for informational and/or control elements. Specifically, the present disclosure provides a dynamic display unit for creating a temporary graphic display spaced apart from or overlying permanent displays in order to provide additional space for informational and/or control elements.

Although certain illustrative embodiments have been described in detail above, variations and modifications exist within the scope and spirit of this disclosure as described and as defined in the claims included in this application.

The invention claimed is:

1. A passenger vehicle comprising
   screen generator for moving media particles generally along a viewing plane to create a vapor screen made up of media particles, and
   a projector that projects light onto the screen to create an image on the vapor screen, the projector arranged to project light generally along a path that is not parallel to a passenger line of sight so that light passing through the vapor screen is not directed into the eyes of a passenger seated in the vehicle,
   a sensor coupled to a controller and configured to detect stability of the vapor screen, and
   further comprising an HVAC system coupled to the controller and configured to provide heating, ventilation, and air-conditioning inside the passenger vehicle, wherein the controller is configured to adjust the operation of the HVAC system in response to receiving stability information relating to the vapor screen,
   wherein the screen generator includes a blower configured to accelerate the media particles making up the screen along the viewing plane,
   wherein the screen generator includes a nozzle configured to atomize a liquid into liquid media particles, and
   wherein the screen generator includes a vacuum spaced apart from the blower and configured to pull and receive the media particles making up the screen along the viewing plane.

2. The passenger vehicle of claim 1, further comprising a medium reservoir coupled to the blower and to the vacuum, the media reservoir configured to store media before acceleration by the blower and after reception by the vacuum.

3. The passenger vehicle of claim 1, further comprising a sensor configured to detect input information relating to a user gesture at the vapor screen.

4. A passenger vehicle comprising
   a particle-screen generator adapted to establish a vapor screen,
   a projector arranged to project light onto a vapor screen established by the particle-screen generator,
   a sensor coupled to a controller and configured to detect stability information relating to the vapor screen, and
   further comprising an HVAC system coupled to the controller and configured to provide heating, ventilation, and air-conditioning inside the passenger vehicle, wherein the controller is configured to adjust the operation of the HVAC system in response to receiving stability information relating to the vapor screen,
   wherein the particle-screen generator includes a blower configured to accelerate media particles making up the screen,
   wherein the particle-screen generator includes a nozzle configured to atomize a liquid into liquid media particles, and
   wherein the particle-screen generator includes a vacuum spaced apart from the blower.

5. The passenger vehicle of claim 4, further comprising a medium reservoir coupled to the blower and to the vacuum.

6. The passenger vehicle of claim 4, further comprising a sensor configured to detect input information relating to a user gesture at the vapor screen.

7. The passenger vehicle of claim 4, further comprising an instrument panel including an upper cowl, a lower cowl, and a gauge panel extending from the upper cowl to the lower cowl, wherein the screen extends between the upper cowl and the lower cowl included in the instrument panel, and the projector is arranged in the upper cowl between the gauge panel and the vapor screen.

8. The passenger vehicle of claim 4, further comprising a console including a top wall and a floor that cooperate to define a storage compartment, wherein the vapor screen extends between the top wall and the floor included in the console.

9. The passenger vehicle of claim 4, further comprising a user interface panel including a touch screen display, wherein the vapor screen extends over the touch screen display and generates a different image than the image generated on the touchscreen display.

10. The passenger vehicle of claim 9, wherein the user interface panel includes a top frame member located above the touch screen display and a bottom frame member located below the touch screen display, and at least a portion of the particle-screen generator moves relative to the touch screen display between a stowed position, housed inside at least one of the top frame member and the bottom frame member, and a deployed position, extending outside the at least one of the top frame member and the bottom frame member.

11. The passenger vehicle of claim 4, wherein the vapor screen extends outward in a radial direction from a central hub to an outer wheel included in a steering wheel.

12. A passenger vehicle comprising
    a dynamic display unit configured to provide a temporary display inside the passenger vehicle, the dynamic display unit including a screen generator, having a blower, a nozzle, and a vacuum, configured to move media particles generally along a viewing plane to create a screen made up of media particles and a projector configured to project light onto the screen to create an image on the vapor screen, and
    a controller coupled to the dynamic display unit, the controller including a memory and a processor coupled to the memory and configured to execute instructions held in the memory,
    wherein the dynamic display unit includes a sensor coupled to the controller and configured to detect stability information relating to the vapor screen, and
    further comprising an HVAC system coupled to the controller and configured to provide heating, ventilation, and air-conditioning inside the passenger vehicle, wherein the controller is configured to adjust the operation of the HVAC system in response to receiving stability information relating to the vapor screen.

13. The passenger vehicle of claim 12, further comprising at least one vehicle sensor coupled to the controller and configured to detect information relating to the passenger vehicle, wherein the controller is configured to change the activation status of the dynamic display unit in response to receiving information from the at least one vehicle sensor.

14. The passenger vehicle of claim 12, wherein the dynamic display unit includes a sensor coupled to the controller and configured to detect input information relating to a user gesture at the vapor screen, and the controller is configured to change the activation status of the dynamic display unit in response to receiving user input information from the sensor.

15. The passenger vehicle of claim 12, further comprising a permanent display unit having an adjustable brightness coupled to the controller, wherein the controller is configured to adjust the brightness of the permanent display unit in response to a change in the activation status of the dynamic display unit.

16. The passenger vehicle of claim 12, wherein the controller is configured to adjust the operation of the screen generator in response to receiving stability information relating to the vapor screen.

17. The passenger vehicle of claim 1, further comprising edge channels or fins to stabilize the vapor screen.

18. The passenger vehicle of claim 4, further comprising edge channels or fins to stabilize the vapor screen.

19. The passenger vehicle of claim 12, further comprising edge channels or fins to stabilize the vapor screen.

* * * * *